(12) United States Patent
Kim et al.

(10) Patent No.: US 8,710,112 B2
(45) Date of Patent: Apr. 29, 2014

(54) METHOD OF MANUFACTURING ACRYLIC FILM, AND ACRYLIC FILM

(75) Inventors: Jangsoon Kim, Seongnam-si (KR); Seungmin Yoo, Gunpo-si (KR); Minseok Song, Daejeon (KR)

(73) Assignee: LG Hausys, Ltd., Seoul (KR)

( * ) Notice: Subject to any disclaimer, the term of this patent is extended or adjusted under 35 U.S.C. 154(b) by 191 days.

(21) Appl. No.: 13/386,478

(22) PCT Filed: Aug. 16, 2010

(86) PCT No.: PCT/KR2010/005396
§ 371 (c)(1),
(2), (4) Date: Jan. 23, 2012

(87) PCT Pub. No.: WO2011/025169
PCT Pub. Date: Mar. 3, 2011

(65) Prior Publication Data
US 2012/0121881 A1    May 17, 2012

(30) Foreign Application Priority Data
Aug. 25, 2009   (KR) ........................ 10-2009-0078978

(51) Int. Cl.
*C08F 2/46* (2006.01)
*C08G 61/04* (2006.01)

(52) U.S. Cl.
USPC ................................................. 522/1; 520/1

(58) Field of Classification Search
USPC ................................................. 522/1; 520/1
See application file for complete search history.

(56) References Cited

U.S. PATENT DOCUMENTS

| | | | |
|---|---|---|---|
| 3,772,062 A | | 11/1973 | Shur et al. |
| 4,379,201 A | * | 4/1983 | Heilmann et al. ............ 428/345 |
| 6,130,269 A | * | 10/2000 | Hosokawa et al. ........... 522/100 |
| 2007/0059521 A1 | * | 3/2007 | Nakamura ............. 428/355 AC |
| 2008/0176972 A1 | | 7/2008 | Hews et al. |
| 2009/0169817 A1 | * | 7/2009 | Nagasaki ....................... 428/147 |
| 2009/0291227 A1 | * | 11/2009 | Niwa et al. ..................... 427/516 |
| 2010/0151241 A1 | * | 6/2010 | Hardy et al. ............ 428/355 AC |

FOREIGN PATENT DOCUMENTS

| | | | |
|---|---|---|---|
| JP | 09-123364 A | | 5/1997 |
| JP | 2003-253225 A | | 9/2003 |
| JP | 2006-241270 A | | 9/2006 |
| KR | 10-2008-0093643 | * | 10/2008 |
| KR | 10-2010-0034725 A | | 4/2010 |
| TW | 406124 B | | 9/2000 |

* cited by examiner

*Primary Examiner* — Ling Choi
*Assistant Examiner* — Jessica E Whiteley
(74) *Attorney, Agent, or Firm* — Nath, Goldberg & Meyer; Joshua B. Goldberg; Lakshmi Rajan

(57) ABSTRACT

The present invention relates to a method for manufacturing an acrylic film and to an acrylic film manufactured by same, the method comprising: a first step of coating an acryl-based resin syrup; and a second step of hardening the acryl-based resin syrup coated in the first step by irradiating ultraviolet light. According to the present invention, an excellent film having low thickness deviation and thickness precision may be provided. In addition, defects in the film such as fish eyes and uneven distribution of physical properties in the vertical and horizontal directions may be kept to a minimum. Consequently, the film according to the present invention can be applied to various industrial sheets such as protective films for various semiconductor processes, pressure-sensitive adhesives or adhesives for optical products and pressure-sensitive adhesives or adhesives for electronic components, or to laminated products.

17 Claims, No Drawings

METHOD OF MANUFACTURING ACRYLIC FILM, AND ACRYLIC FILM

This is a National Phase Application filed under 35 U.S.C. 371 as a national stage of PCT/KR2010/005396, filed 16 Aug. 2010, claiming the benefit from Korean Application No. 10-2009-0078978, filed 25 Aug. 2009, the content of each of which is hereby incorporated by reference in its entirety.

TECHNICAL FIELD

The present invention relates to a method of manufacturing an acrylic film and an acrylic film.

BACKGROUND ART

Adhesive products, such as adhesive films and adhesive sheets, are widely used not only for protective films used to for various semiconductor processes, such as dicing and backgrinding, but also for various industrial sheets, such as protective films, films for advertisement, cleaning sheets, reflective sheets, adhesive sheets for structures, photos and lane marking, optical adhesive products, adhesive products for electronic components, and medial patches or multi-layered laminate products.

Base films included in these adhesive films or adhesive sheets generally include plastic films, such as polyethylene terephthalate (PED), polyolefin, polyurethane, ethylene-vinyl acetate, polybutylene terephthalate, polypropylene, and polyethylene.

These plastic films may be prepared by melting various thermoplastic resins and applying the melted resins to T-shaped die, blotting-extruding or calendering. A film prepared by extruding or calendering has excellent productivity and is inexpensive.

However, according to these methods, improper foreign materials are introduced into the resin while forming a film, or insoluble ingredients exist, causing a high possibility of forming protrusions, so called fish eyes, on the film. Further, according to these methods, it is difficult to obtain uniform film thickness, and considerable differences in physical properties between vertical and horizontal directions of a film occur due to stress applied during a manufacturing process.

Thus, when a film prepared by conventional methods is applied to dicing or backgrinding, cracking or bending of a wafer is likely to occur due to non-uniform pressure. Further, various problems occur when such a film is applied to other uses.

DISCLOSURE

Technical Problem

The present invention is directed to solving the problems or the related art and provides a method of manufacturing an acrylic film and an acrylic film.

Technical Solution

In accordance with an aspect of the present invention, a method of manufacturing an acrylic film includes applying an acrylic resin syrup; and curing the acrylic resin syrup by UV irradiation.

In accordance with another aspect of the present invention, there is provided an acrylic film prepared by the method according to the present invention.

Advantageous Effects

As such, according to embodiments of the present invention, a film having small thickness deviation and excellent thickness precision may be manufactured. Further, defects in the film such as fish eyes and property differences between vertical and horizontal directions of the film may be minimized. Accordingly, the film according to the embodiments of the present invention may be applied to various industrial sheets, such as protective films for various semiconductor processes, pressure-sensitive adhesives or adhesives for optical products and for electronic components, or to multi-layered laminated products.

MODE FOR INVENTION

The present invention relates to a method of manufacturing an acrylic film which includes applying an acrylic resin syrup; and curing the acrylic resin syrup by UV irradiation.

Hereinafter, the method of manufacturing the acrylic film according to the present invention will be described in detail.

The acrylic resin syrup may have any composition. For example, the acrylic resin syrup may include an acrylic polymer, a reactive monomer, and a photoinitiator.

Here, the acrylic polymer included in the acrylic resin syrup may have any composition. For example, the acrylic copolymer may have a glass transition temperature of 30° C. or higher in consideration of the glass transition temperature or tack of a finally cured product. If the glass transition temperature of the acrylic copolymer is less than 30° C., the produced film has too low a glass transition temperature or excessively high tack and thus may be limitedly used.

The acrylic copolymer may be, for example, a polymer of a monomer mixture including at least one selected from the group consisting of (meth)acrylic acid alkyl esters, (meth)acrylic acid aryl esters, (meth)acrylic acid alkoxyalkyl esters, carboxyl group containing compounds, hydroxyl group containing compounds, nitrogen containing compounds, glycidyl group containing compounds, styrene compounds, and carbonic acid vinyl esters.

Examples of the (meth)acrylic acid alkyl ester may include alkyl(meth)acrylates having C1 to C20 straight-chain, branched-chain, cyclic, or noncyclic alkyl groups, such as methyl(meth)acrylate, ethyl(meth)acrylate, propyl(meth)acrylate, butyl(meth)acrylate, hexyl(meth)acrylate, cyclohexyl(meth)acrylate, 2-ethylhexyl(meth)acrylate, lauryl(meth)acrylate, stearyl(meth)acrylate, octadecyl(meth)acrylate, isooctyl(meth)acrylate, isononyl(meth)acrylate, isodecyl(meth)acrylate, and isobornyl(meth)acrylate. Examples of the (meth)acrylic acid aryl ester may include aryl(meth)acrylates, such as phenyl(meth)acrylate, benzyl(meth)acrylate, and phenoxyethyl(meth)acrylate. Examples of the (meth)acrylic acid alkoxyalkyl ester may include alkoxyalkyl(meth)acrylates, such as methoxyethyl(meth)acrylate, ethoxyethyl(meth)acrylate, propoxyethyl(meth)acrylate, butoxyethyl(meth)acrylate, and ethoxypropyl(meth)acrylate.

Examples of the carboxyl group containing compound may include (meth)acrylic acid, 2-(meth)acryloyloxy acetic acid, 3-(meth)acryloyloxy propyl acid, 4-(meth)acryloyloxy butyl acid, an acrylic acid dimer, itaconic acid, maleic acid, and maleic anhydride. Examples of the hydroxyl group containing compound may include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxy ethylene glycol (meth)acrylate, and 2-hydroxy propylene glycol(meth)acrylate. Examples of the nitrogen containing compound may include (meth)acryl amide and n-methylol(meth)acrylamide. An example of the glycidyl group containing monomer may include glycidyl (meth)acrylate. Examples of the styrene compound may include styrene and alpha-methyl styrene, and an example of the carbonic acid vinyl ester may include vinyl acetate, without being limited thereto.

Among these monomers, the kind and ratios of monomers to be included in the monomer mixture are not particularly limited and may be optionally selected in view of desired glass transition temperature and properties of other polymers.

In the present invention, the acrylic polymer including the above components may be prepared by any method known in the art. For example, general polymerization methods, such as solution polymerization, photopolymerization, bulk polymerization, suspension polymerization, or emulsion polymerization, may be used. Particularly, solution polymerization may be used. Here, solution polymerization may be performed by adding an initiator to uniformly mixed monomers at 50 to 140° C. Here, available initiators may include azo polymerization initiators, such as azobisisobutyronitrile and azobiscyclohexanecarbonitrile; and/or peroxide initiators, such as benzoyl peroxide and acetyl peroxide.

The acrylic polymer may be present in an amount of 5 to 80 parts by weight in the resin syrup based on 100 parts by weight of the reactive monomer. If the amount of acrylic polymer is less than 5 parts by weight, an acrylic film can excessively increase in ductility or can be easily damaged by external impact. If the amount of acrylic polymer is greater than 80 parts by weight, a degree of film curing is decreased, making it difficult to maintain the shape of the film, or the viscosity of the syrup excessively increases, reducing process efficiency.

In addition to the acrylic polymer, the resin syrup may include a reactive monomer which dilutes the polymer.

The reactive monomer may include any monomer having a photopolymerizable double bond. For example, an acrylic monomer may be used. Examples of the acrylic monomer may include, without being limited to, alkyl(meth)acrylates having C1 to C12 alkyl groups, such as methyl(meth)acrylate, ethyl(meth)acrylate, n-propyl(meth)acrylate, isopropyl (meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl (meth)acrylate, isooctyl(meth)acrylate, isobornyl(meth) acrylate, isononyl(meth)acrylate, lauryl(meth)acrylate, adamantine(meth)acrylate, and tetradecyl(meth)acrylate; alicyclic(meth)acrylates, such as dicyclopentenyl(meth)acrylate, and dicyclopentenyloxy(meth)acrylate; aromatic(meth)acrylates, such as phenyl hydroxypropyl(meth)acrylate and benzyl(meth)acrylate; and heterocyclic(meth)acrylates, such as tetrahydrofurfuryl(meth)acrylate and morpholinyl(meth) acrylate.

As the reactive monomer, a polar monomer may be used alone or in combination with the acrylic monomers. Examples of the polar monomer may include a hydroxyl group containing monomer, such as 2-hydroxyethyl(meth) acrylate, 2-hydroxypropyl(meth)acrylate, 4-hydroxybutyl (meth)acrylate, 6-hydroxyhexyl(meth)acrylate, 8-hydroxyoctyl(meth)acrylate, 2-hydroxy ethylene glycol(meth) acrylate, and 2-hydroxy propylene glycol(meth)acrylate; a carboxyl group containing monomer, such as (meth)acrylic acid, 2-(meth)acryloyloxy acetic acid, 3-(meth)acryloyloxy propyl acid, 4-(meth)acryloyloxy butyl acid, an acrylic acid dimer, itaconic acid, maleic acid, and maleic anhydride; and a nitrogen containing monomer, such as (meth)acryl amide, N-vinylpyrrolidone, and N-vinylcaprolactam. Proper use of the polar monomer enables effective control of cohesion and mechanical strength of the acrylic film.

The resin syrup may further include a photoinitiator in addition to the components as described above. The photoinitiator may control a polymerization degree of the resin syrup depending on amount used. In the present invention, the photoinitiator may be present in an amount of 0.01 to 30 parts by weight based on 100 parts by weight of the reactive monomer. The amount of photoinitiator may be controlled in view of polymerization degree of the syrup and physical properties of the film, without being limited to the above range.

The photoinitiator may include any material which initiates polymerization reaction through UV irradiation. Examples of the photoinitiator may include, without being limited to, α-hydroxyketone compounds, e.g., IRGACURE 184, IRGACURE 500, IRGACURE 2959, and DAROCUR 1173 (manufactured by Ciba Specialty Chemicals); phenylglyoxylate compounds, e.g., IRGACURE 754 and DAROCUR MBF (manufactured by Ciba Specialty Chemicals); benzyl dimethyl ketal compounds, e.g., IRGACURE 651 (manufactured by Ciba Specialty Chemicals); α-aminoketone compounds, e.g., IRGACURE 369, IRGACURE 907, and IRGACURE 1300 (manufactured by Ciba Specialty Chemicals); monoacyl phosphine compounds (manufactured by MAPO), e.g., DAROCUR TPO (manufactured by Ciba Specialty Chemicals); bisacylphosphine compounds (manufactured by BAPO), e.g., IRGACURE 819 and IRGACURE 819DW (manufactured by Ciba Specialty Chemicals); phosphine oxide compounds, e.g., IRGACURE 2100 (manufactured by Ciba Specialty Chemicals); metallocene compounds, e.g., IRGACURE 784 (manufactured by Ciba Specialty Chemicals); iodonium salt, e.g., IRGACURE 250 (manufactured by Ciba Specialty Chemicals); and mixtures thereof, e.g., DAROCUR 4265, IRGACURE 2022, IRGACURE 1300, IRGACURE 2005, IRGACURE 2010, IRGACURE 2020 (manufactured by Ciba Specialty Chemicals). These photoinitiators may be used alone or in combination of two or more thereof, without being limited thereto.

The resin syrup may further include a thermal initiator as needed. The thermal initiator may improve a conversion rate of the resin syrup depending on amount used. In particular, even when the final acrylic film is formed remarkably thick, the film may have uniform physical properties.

The thermal initiator is not limited to a particular kind. Examples of the thermal initiator may include, without being limited to, azo compounds, such as 2,2'-azobis(2-methylbutyronitrile), 2,2'-azobis(isobutyronitrile), 2,2'-azobis(2,4-dimethylvaleronitrile), 4,4-azobis(4-cyanovaleric acid), 1,1'-azobis(cyclohexanecarbonitrile), and 2,2'-azobis(4-methoxy-2,4-dimethylvaleronitrile); peroxides, such as tetramethylbutyl peroxyneodecanoate (e.g., Perocta ND, manufactured by NOF), bis(4-butylcyclohexyl)peroxydicarbonate (e.g., Peroyl TCP, manufactured by NOF), di(2-ethylhexyl)peroxycarbonate, butylperoxy neodecanoate (e.g., Perbutyl ND, manufactured by NOF), dipropyl peroxydicarbonate (e.g., Peroyl NPP, manufactured by NOF), diisopropyl peroxydicarbonate (e.g., Peroyl IPP, manufactured by NOF), diethoxyethyl peroxydicarbonate (e.g., Peroyl EEP, manufactured by manufactured by NOF), diethoxyhexyl peroxydicarbonate (e.g., Peroyl OEP, manufactured by NOF), hexyl peroxydicarbonate (e.g., Perhexyl ND, manufactured by NOF), dimethoxybutyl peroxydicarbonate (e.g., Peroyl MBP, manufactured by NOF), bis(3-methoxy-3-methoxybutyl) peroxydicarbonate (e.g., Peroyl SOP, manufactured by NOF), dibutyl peroxydicarbonate, dicetyl peroxydicarbonate, dimyristyl peroxydicarbonate, 1,1,3,3-tetramethylbutyl peroxypivalate, hexylperoxy pivalate (e.g., Perhexyl PV, manufactured by NOF), butylperoxy pivalate (e.g., Perbutyl, manufactured by NOF), trimethylhexanoyl peroxide (ex. Peroyl 355, manufactured by NOF), dimethyl hydroxybutyl peroxyneodecanoate (e.g., Luperox 610M75, manufactured by Atofina), amyl peroxy neodecanoate (e.g., Luperox 546M75, manufactured by Atofina), butyl peroxy neodecanoate (e.g., Luperox 10M75, manufactured by Atofina), t-butylperoxy neoheptanoate, amyl peroxy pivalate (e.g., Luperox 546M75, manufactured by Alofina), t-butylperoxy pivalate, t-amylperoxy-2-ethylhexanoate, lauryl peroxide, dilauroyl peroxide, didecanoyl peroxide, benzoyl peroxide, dibenzoyl peroxide, 2,2-bis(tert-butylperoxy) butane, 1,1-bis(tert-butylperoxy)cyclohexane, 2,5-bis(butylperoxy)-2,5-dimethylhexane, 2,5-bis(tert-butylperoxy)-1-methylethyl)benzene, 1,1-bis(tert-butylperoxy)-3,3,5-trimethylcyclohexane, tert-butyl hydroperoxide, tert-butyl peroxide, tert-butyl peroxybenzoate, tert-butylperoxy isopropyl carbonate, cumene hydroperoxide, dicumyl peroxide, lauroyl peroxide, and 2,4-pentanedione peroxide; tert-butyl peracetate; peracetic acid; and potassium persulfate.

The thermal initiator may be present in an amount of 0.01 to 10 parts by weight in the resin syrup based on 100 parts by weight of the reactive monomer. However, the above range of amount of the thermal initiator is an illustrative example only, and the amount of the thermal initiator may be selected in view of desired effects of improving conversion rate.

The resin syrup may further include 0.05 to 50 parts by weight of a crosslinker based on 100 parts by weight of the reactive monomer. The crosslinker may improve physical properties of the acrylic film, such as tensile properties, depending on amount used.

The crosslinker used in the present invention may include, without being particularly limited, multifunctional acrylates. In this case, any multifunctional acrylate may be used. Examples of the multifunctional acrylate may include, without being limited to, bifunctional acrylates, such as 1,4-butanediol di(meth)acrylate, 1,6-hexanediol di(meth)acrylate, neopentyl glycol di(meth)acrylate, polyethylene glycol di(meth)acrylate, neopentyl glycol adipate, hydroxyl pivalic acid, neopentyl glycol di(meth)acrylate, dicyclopentanyl di(meth)acrylate, caprolactone modified dicyclopentenyl di(meth)acrylate, ethyleneoxide modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide modified hexahydrophthalic acid di(meth)acrylate, tricyclodecane dimethanol(meth)acrylate, neopentyl glycol modified trimethylpropane di(meth)acrylate, adamantane di(meth)acrylate or 9,9-bis[4-(2-acryloyloxyethoxy)phenyl]fluorene); trifunctional acrylates, such as trimethylolpropane tri(meth)acrylate, dipentaerythritol tri(meth)acrylate, propionic acid modified dipentaerythritol tri(meth)acrylate, pentaerythritol tri(meth)acrylate, propyleneoxide modified trimethylolpropane tri(meth)acrylate, trifunctional urethane (meth)acrylate or tris(meth)acryloxyethylisocyanurate; tetrafunctional acrylates, such as digylcerin tetra(meth)acrylate or pentaerythritol tetra(meth)acrylate; pentafunctional acrylates, such as propionic acid modified dipentaerythritol penta(meth)acrylate; and hexafunctional acrylates, such as dipentaerythritol hexa(meth)acrylate, caprolactone modified dipentaerythritol hexa(meth)acrylate or urethane (meth)acrylate (e.g., reaction products of isocyanate monomer and trimethylolpropane tri(meth)acrylate).

The multifunctional acrylate may be present in an amount of 0.05 to 50 parts by weight based on 100 parts by weight of the reactive monomer. However, the above range is an illustrative example only, and the amount of the multifunctional acrylate may be optimally controlled in view of process efficiency or physical properties of the film, e.g., glass transition temperature.

The resin syrup may further include at least one suitable additive selected from the group consisting of thermal conductive additives, flame retardants, pigments, antioxidants, UV stabilizers, dispersants, antifoaming agents, thickeners, plasticizers, and silane coupling agents, as needed.

The resin syrup may be prepared by properly mixing the above components by any method known in the art. In this present, the resin syrup may have a solid content of 100%, that is, the resin syrup may be prepared in a solventless form. The solventless resin syrup may improve process efficiency and may form a film having uniform thickness deviation without defects including protrusions (fish eyes). Further, since the solvent is not used, it is easy to manufacture a thick film and a solvent volatizing process is not needed, thereby enabling elimination of a drier such as a dry oven in practice. Further, due to elimination of a solvent volatizing process, there is no need for purifying equipment involved in volatizing a solvent and environmental contamination does not occur during or after processing.

In the present invention, the viscosity of the acrylic resin syrup may be controlled to about 100 to 10,000 cps. When the resin syrup is controlled within this range, processes may be efficiently performed.

As an initial operation in the method of manufacturing an acrylic film, the resin syrup thus prepared is applied. Here, the resin syrup may be applied by any method, for example, casting. Specifically, the resin syrup is deposited on a proper base by a generally used method, such as bar coating, knife coating, roll coating, spraying, gravure coating, curtain coating, comma coating and/or rip coating, thereby forming a layer. The layer is formed in this manner and subjected to UV irradiation, thereby obtaining a film having improved physical properties, such as thickness uniformity, high-temperature dimensional stability, cutting property, and transparency. Specifically, the resin syrup in a liquid state is cast on a proper base and formed into a film, and the base is then eliminated, thereby producing an acrylic film. With this process, stress is minimally applied to the resin in forming the film and dimensional change with time or by heating does not occur. Further, this process facilitates removal of solid impurities and suppresses generation of protrusion parts (fish eyes) on the produced film, thereby improving uniformity and preciseness of film thickness. Further, this process may improve stress relieving performance of the film, thereby quickly easing remaining stress occurring when the film is attached to an adherend.

The base used in application of the resin syrup may include any type of base. For example, the base may include generally used plastic substrates (e.g., PET substrate), paper, felt, glass, or metal substrates. In the present invention, these substrates may be subjected to releasing treatment for use.

Next, the applied resin syrup is cured through UV irradiation, thereby polymerizing the resin syrup. UV irradiation may be performed by any method, for example, using a high-pressure mercury lamp, an induction lamp, or a xenon lamp.

For example, curing the resin syrup may be performed by irradiating UV (wavelength: 230 nm to 400 nm) having an illuminance of 5 to 200 mW/cm$^2$ for about 2 seconds to 20 minutes. Here, a light energy per unit area of the UV may be controlled within the range of 4 to 2,000 mJ/cm$^2$.

However, it should be understood that the above conditions of UV irradiation are provided for illustration only. That is, UV irradiation conditions are not particularly limited so long as the resin syrup is sufficiently cured without damaging overall physical properties.

When the resin syrup includes a thermal initiator in addition to a photoinitiator, the thermal initiator may participate in polymerization reaction by heat generated during UV irradiation in a reaction system. In this case, when heat generated in UV curing reaction is insufficient to initiate polymerization reaction of the thermal initiator, hot air or heat by infrared heating may be properly applied to the resin syrup during or after UV irradiation.

After curing the resin syrup, the base is removed by a proper method, thereby manufacturing an acrylic film.

The present invention also relates to an acrylic film prepared by the method according to the present invention.

As described above, a liquid resin syrup, preferably a resin syrup having a solid content of 100%, is cast and cured, thereby producing a film having improved physical properties, such as thickness uniformity, high-temperature dimensional stability, cutting properties, stress relieving performance, and transparency.

Thus, the acrylic film according to the present invention may be effectively employed as a base film used for not only protective films for various semiconductor processes, such as dicing and backgrinding, but also for various industrial sheets, such as protective films, films for advertisement, cleaning sheets, reflective sheets, adhesive sheets for structures, photos, and lane marking, optical adhesive products, and adhesive products for electronic components. Further, the acrylic film may also be effectively used for multi-layered laminate products, e.g., commercial adhesive products, medical patches, or heat activated pressure-sensitive adhesives.

Physical properties of the film may be adjusted depending on applications of the film. For example, the thickness of the film may be properly controlled within the range 0.02 to 3 mm, preferably 0.05 to 1 mm. If the thickness of the film is less than 0.02 mm, thickness uniformity may decrease. If the thickness of the film is greater than 3 mm, the amount of UV or heat to be irradiated may excessively increase. Further, the produced film may have damaged or non-uniform internal or surficial physical properties.

EXAMPLES

Hereinafter, the present invention will be explained in more detail with reference to the following examples and comparative examples. These examples are provided for illustrative purposes only and are not to be in any way construed as limiting the present invention.

Example 1

100 parts by weight of methyl methacrylate as a reactive monomer and 50 parts by weight of poly(methyl methacrylate) having a weight average molecular weight of 100,000 as an acrylic polymer were dispersed and stirred for more than 30 minutes. Then, 5 parts by weight of (2,4,6-trimethylbenzoyl)diphenylphosphine oxide (TPO) as a photoinitiator was added to the mixture and further stirred for more than 30 minutes, thereby preparing a resin syrup having a solid content of 100%. Subsequently, the resin syrup was deposited to a thickness of 150 μm on a PET substrate having a thickness of 38 μm using a knife coater. The deposited resin syrup was disposed under a metal halide lamp and cured by UV irradiation at 10 mW/cm$^2$ for about 3 minutes, thereby manufacturing an acrylic film.

Example 2

An acrylic film was manufactured in the same manner as in Example 1 except that a resin syrup was prepared using 50 parts by weight of methyl methacrylate and 50 parts by weight of butyl acrylate as a reactive monomer, 50 parts by weight of poly(methyl methacrylate), and 5 parts by weight of (2,4,6-trimethylbenzoyl)diphenylphosphine oxide (TPO).

Example 3

An acrylic film was manufactured in the same manner as in Example 1 except that a resin syrup was prepared using 100 parts by weight of butyl acrylate as a reactive monomer, 50 parts by weight of poly(methyl methacrylate), and 5 parts by weight of (2,4,6-trimethylbenzoyl)diphenylphosphine oxide (TPO).

Example 4

100 parts by weight of butyl acrylate as a reactive monomer, 50 parts by weight of poly(methyl methacrylate), 3 parts by weight of (2,4,6-trimethylbenzoyl)diphenylphosphine oxide (TPO) as a photoinitiator, and 2 parts by weight benzoyl peroxide (BPO) as a thermal initiator were mixed to prepare a resin syrup, followed by UV curing in the same manner as in Example 1. Then, the UV cured product was further thermally cured by applying heat of 110° for 3 minutes, thereby manufacturing an acrylic film.

1. Measurement of Conversion Rate

Each of the acrylic films prepared in Examples was cut into a 10 cm×10 cm specimen and the weight of the specimen was measured. The specimen was left in a hot-air oven at 110° C. for 1 hour. Then, the weight of the acrylic film was measured, and weight decrease was converted into percentage, thereby calculating conversion rate.

Results are shown in Table 1.

TABLE 1

|  |  | Example | | | |
|---|---|---|---|---|---|
|  |  | 1 | 2 | 3 | 4 |
| Acrylic polymer | (PMMA) | 50 | 50 | 50 | 50 |
| Reactive | MMA | 100 | 50 | — | — |
| monomer | BA | — | 50 | 100 | 100 |
| Photoinitiator | TPO | 5 | 5 | 5 | 3 |
| Thermal initiator | BPO | — | — | — | 2 |

TABLE 1-continued

| | Example | | | |
|---|---|---|---|---|
| | 1 | 2 | 3 | 4 |
| Curing method | UV (3 min.) | UV (3 min.) | UV (3 min.) | UV (3 min.)/ heat (3 min.) |
| Conversion rate (%) | 96 | 98 | 95 | 99 |

PMMA: Poly(methyl methacrylate) (Mw = 100,000)
MMA: Methyl methacrylate
BA: Butyl acrylate
TPO: (2,4,6-trimethylbenzoyl)diphenylphosphine oxide
BPO: Benzoyl peroxide As shown in Table 1, when the resin syrup having a solid content of 100% is deposited, formed into a layer, and cured to prepare a film according to the present invention, the film has excellent thickness uniformity, uniform distribution of physical properties in the vertical and horizontal directions, and a conversion rate of 95% or more. In particular, when the resin syrup includes both the photoinitiator and the thermal initiator to perform dual curing, conversion rate is further enhanced.

The invention claimed is:

1. A method of manufacturing an acrylic film comprising:
applying an acrylic resin syrup; and
curing the acrylic resin syrup by UV irradiation, wherein the resin syrup has a solid content of 100% by weight, and, wherein said curing of the acrylic resin syrup is performed by irradiating UV having an illuminance of 5 to 200 mW/cm$^2$ for 2 seconds to 20 minutes.

2. The method of claim 1, wherein the acrylic resin syrup comprises an acrylic polymer, a reactive monomer, and a photoinitiator.

3. The method of claim 2, wherein the acrylic copolymer has a glass transition temperature of 30° C. or higher.

4. The method of claim 2, wherein the acrylic polymer comprises a polymer of a monomer mixture including at least one selected from the group consisting of (meth)acrylic acid alkyl esters, (meth)acrylic acid aryl esters, (meth)acrylic acid alkoxyalkyl esters, carboxyl group containing compounds, hydroxyl group containing compounds, nitrogen containing compounds, glycidyl group containing compounds, styrene compounds, and carbonic acid vinyl esters.

5. The method of claim 2, wherein the resin syrup comprises of 5 to 80 parts by weight of the acrylic polymer based on 100 parts by weight of the reactive monomer.

6. The method of claim 2, wherein the reactive monomer comprises at least one selected from the group consisting of alkyl (meth)acrylate, alicyclic (meth)acrylate, aromatic (meth)acrylate, and heterocyclic (meth)acrylate.

7. The method of claim 2, wherein the reactive monomer comprises at least one selected from the group consisting of hydroxyl group containing monomers, carboxyl group containing monomers, and nitrogen containing monomers.

8. The method of claim 2, wherein the resin syrup comprises 0.01 to 30 parts by weight of the photoinitiator based on 100 parts by weight of the reactive monomer.

9. The method of claim 2, wherein the photoinitiator comprises at least one selected from the group consisting of α-hydroxyketone compounds, phenylglyoxylate compounds, benzyl dimethyl ketal compounds, α-aminoketone compounds, monoacyl phosphine compounds, bisacylphosphine compounds, phosphine oxide compounds, and metallocene compounds.

10. The method of claim 2, wherein the resin syrup further comprises a thermal initiator.

11. The method of claim 10, wherein the thermal initiator comprises at least one selected from the group consisting of azo compounds, peroxides, tert-butyl peracetate, peracetic acid, and potassium persulfate.

12. The method of claim 2, wherein the resin syrup further comprises a crosslinker.

13. The method of claim 12, wherein the crosslinker comprises a multifunctional acrylate.

14. The method of claim 1, wherein the applying an acrylic resin syrup is performed by applying the resin syrup to a substrate.

15. The method of claim 1, wherein the curing the acrylic resin syrup is performed by further applying heat to the resin syrup.

16. An acrylic film manufactured by the method of claim 1.

17. The acrylic film of claim 16, wherein the acrylic film has a thickness of 0.02 to 3 mm.

* * * * *